United States Patent

[11] 3,602,486

| [72] | Inventor | Constant Johan Nauta<br>Overveen, Netherlands |
|---|---|---|
| [21] | Appl. No. | 841,000 |
| [22] | Filed | July 11, 1969 |
| [45] | Patented | Aug. 31, 1971 |
| [73] | Assignee | Nautamix Patent A.G.<br>Zug, Switzerland |
| [32] | Priority | July 18, 1968 |
| [33] | | Netherlands |
| [31] | | 6810202 |

[54] DEVICE FOR STIRRING MATERIAL OR DRYING SLURRIES OR SLUDGES
10 Claims, 1 Drawing Fig.

[52] U.S. Cl. .................................................. 259/102
[51] Int. Cl. ...................................................... B01f 7/00
[50] Field of Search ........................................... 259/102,
5–8, 16, 21–24, 32–34, 40–44, 64–67

[56] References Cited
UNITED STATES PATENTS

| 2,831,663 | 4/1958 | Nauta .......................... | 259/102 |
| 3,338,562 | 8/1967 | Fox ............................. | 259/40 |
| 3,450,390 | 6/1969 | Nauta .......................... | 259/102 |

Primary Examiner—Jordan Franklin
Assistant Examiner—Geo. V. Larkin
Attorney—Arnold Robinson ABSTRACT: A device for stirring and mixing materials and for drying slurries, sludges and the like comprises a vessel having a vertical axis of symmetry. Two stirring members are mounted in the vessel. One of the stirring members rotates about its own axis while revolving about a circular path about the axis of symmetry of the vessel while the other stirring member rotates about its own axis while revolving about the axis of symmetry of the vessel and simultaneously moving alternately towards and away from the sidewalls of the vessel.

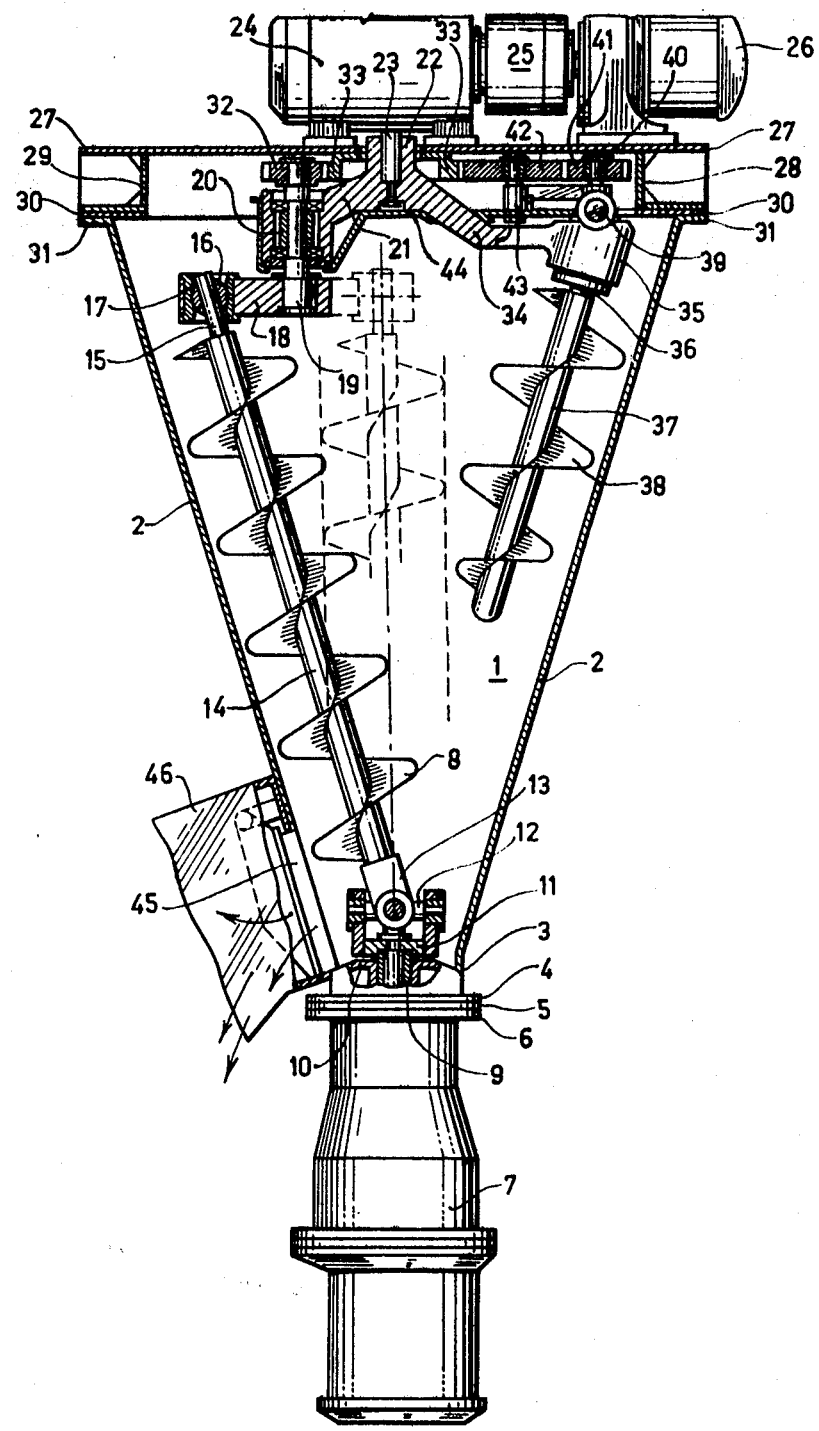

DEVICE FOR STIRRING MATERIAL OR DRYING SLURRIES OR SLUDGES

The invention relates to a device for stirring and mixing various materials, for instance pulverulent, granular, pasty and liquid substances, or for drying slurries or sludges. The device of the present invention comprises at least a vessel having a vertical axis of symmetry and at least two stirring members disposed in the vessel. The upper end of the shaft of each stirring member is rotatably supported in the outer end of an arm, the latter in turn being secured to a body arranged coaxial with the vessel and supported rotatably in bearings fixed to the vessel. The arm extends from said body towards the sidewall of the vessel, and drive means are provided to cause rotation of the body. Thus the assembly including the body, the arms and the stirring members rotate about the axis of the vessel and rotation of each stirring member aboutitsownaxisis simultaneouslyeffectedbyothersuitabledrivemeans.

Inknown devices of this type comprising more than one stirring member in a vessel, each stirring member revolves about the axis of the vessel in a circular path within a zone adjacent to the sidewall of the vessel. Usually this known arrangement is advantageous because there exists a cooperative effort or effect between each stirring member and the vessel sidewall. This cooperative effort contributes considerably to the efficiency of the device during operation. However, in certain circumstances, for instance when the vessel is of a large capacity or the material to be treated is of a very special kind, the arrangement of the known stirring members as heretofore described results in a disadvantage in that the material which accumulates in the zone directly surrounding the axis of symmetry of the vessel will not be contacted by any of the stirring members disposed in the vessel so that this portion of the material will not be handled or treated sufficiently.

An object of the present invention is to provide a device which overcomes the aforementioned disadvantages of known prior art arrangements but at the same time is able to achieve the advantageous result provided by using at least one stirring member cooperating with the sidewall of the vessel. Therefore, the device according to the present invention is characterized in that at least one of the stirring members is provided with drive means which rotate the stirring member about the axis of the vessel in a circular path within a zone adjacent to the sidewall of the vessel. Another stirring member is provided with operable means to rotate said stirring member about the axis of the vessel, while simultaneously moving said stirring member in a radial direction alternately towards and away from the sidewall of the vessel. When treating material of a special kind in a vessel having a smaller capacity, it is preferred to use only two stirring members, one disposed in the vessel diametrically opposed to the other. In such a case the stirring member revolves about the axis of the vessel and simultaneously moves in a radial direction alternately towards and way from the sidewall of the vessel. Such stirring member extends nearly the full inside height of the vessel whereas a second stirring member which revolves in a circular path about the axis of the vessel is supported only at the upper end of its shaft and extends downwards from said supported upper end to a considerable lesser depth within the vessel.

In order that the invention may be clearly understood, reference will now be made by way of example to the accompanying drawing, which is a vertical axial section through a device constructed according to one embodiment of the invention.

The illustrated device comprises a mixing vessel 1 of an inverted frustoconical shape. The sidewall 2 of the vessel has at its lower end a short cylindrical section 3 provided with a flange 4. By means of bolts (not shown) a housing 7 having a flange 6 is connected to the flange 4, and a gasket ring 5 is interposed between the mating flanges 4 and 6. The housing 7 is adapted to accommodate a conventional drive means (not shown) to rotate a mixing screw 8 disposed in the vessel 1 about its own axis. The output shaft 9 of the drive means is accommodated in the housing 7 and is rotatably supported in a bearing 10 provided in the cylindrical section 3 of the sidewall 2. The upper end of the shaft 9 is provided with a forked element 11 having a pin 12 secured in the legs of the forked element. The lower end 13 of the shaft 14 of the mixing screw 8 is pivotally connected to the pin 12.

The upper end 15 of shaft 14 is rotatably supported in a bore in a ball 16 of a ball bearing 17 carried on the end of an arm 18 extending radially of the vessel 1. The arm 18 is fixed on the lower end of a shaft 19 which is supported rotatably in a sleeve bearing 20. This bearing 20 is mounted in the end of an arm 21 which forms a part of a drive body 22. The drive body 22 is fixed on the output shaft 23 of a reduction gearbox 24. The input shaft (not shown) of the reduction gearbox 24 is connected by means of an adjoining box 25 to the shaft of an electric motor 26. The reduction gearbox 24 and the electric motor 26 are mounted on a plate 27 provided across the upper opening of the vessel 1. The plate 27 is supported on the upper flange 31 of the sidewall 2 of the vessel 1 by means of profilated bars 28 and 29 and platelike elements 30 are interposed between each profilated bar and the plate 27. A gear 32 is fixed on the upper part of the end of the shaft 19 which extends above the sleeve bearing 20. The gear 32 meshes with gear teeth located on the outer periphery of a rim 33 fixed on the underside of the supporting plate 27.

The drive body 22 has a second arm 34 extending diametrically opposite to the arm 21. The end of the arm 34 opposite the drive body 22 has a support body 35 rotatably supporting the end pin 36 of the shaft 37 of a second mixing screw 38. The support body 35 includes a universal joint 39 joining the pin 36 of the shaft 37 to a drive shaft 40 which has mounted thereon a gear 41. The gear 41 meshes with another gear 42 rotatably supported on a pin 43. The pin 43 is fixed to a plate 44 which is in turn secured to the drive body 22. The gear 42 meshes with the external teeth on the previously described rim 33.

An outlet 45 is located on the sidewall 2 of the vessel 1 and said outlet is provided with suitable closure means to close the outlet. Also means are provided to temporarily fasten a bag 46 or other container means to said outlet.

In operation, the mixing screw 8 which extends to nearly the full inside height of the mixing vessel 1 is rotated about its own axis as it is driven by drive means disposed therebelow. Simultaneously, the upper end of said mixing screw 8 revolves about the axis of symmetry of the vessel when driven by the electric motor 26 via the transmission elements 25, 24, 23, 21, 20, 19, 18, 16 whereas, at the same time, the gear 32 drives the shaft 19 and thus the arm 18 about the longitudinal axis of the shaft 19 so that the upper end of the mixing screw 8 moves alternately towards and away from the sidewall 2 of the vessel 1. The position of the mixing screw 8 when it is located nearest to the axis of symmetry of the vessel 1 is partially shown diagrammatically in broken lines.

At the same time, the second mixing screw 38 revolves about the axis of symmetry of the vessel 1 and simultaneously rotates about its own axis. The aforesaid revolution and rotation is effected by the electric motor 26 via the transmission elements 25, 24, 23, 22, 34, 35 and 33, 42, 41, 40, 39, respectively. Consequently, the mixing screw 8 contacts the material to be treated alternately in several zones located at different distances from the sidewall 2 of the vessel 1 whereas the mixing screw 38 revolving in a circular path in a zone directly bordering said sidewall remains at substantially the same distance from the inner annular surface of said sidewall.

Details of the invention may be varied while still remaining within the scope of the invention. For example, more than one vessel may be provided and more than two stirring members may be used in one vessel. Also the construction and configuration of the stirring members and the type of drive means used may be varied. Further, the upper end of the mixing screw 8 may be connected to drive means adapted to reciprocate said end in a straight path towards and away from the sidewall of the vessel.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form herein before described being merely a preferred embodiment thereof.

I claim:

1. A device for stirring and mixing materials and for drying slurries, sludges, and the like, comprising a vessel having a vertical axis of symmetry, a first elongated stirring member rotatably mounted in said vessel, driving means for rotating said first stirring member about its longitudinal axis, support body means mounted for rotation about the axis of symmetry of said vessel, a second elongated driving member mounted at its upper end for rotation in said support body means and at a location spaced from said axis of rotation, said operable means rotatably supporting the upper end portion of said first stirring member and drive means for rotating said support body means about the axis of symmetry of the vessel and for driving said operable means whereby said second stirring member revolves in a circular path about the axis of symmetry of the vessel and said first stirring member revolves about the axis of symmetry of the vessel and simultaneously moves alternately towards and away from the sidewalls of the vessel.

2. A device according to claim 1 wherein said operable means is mounted for rotation on said support body means about an axis spaced from the latter's axis of rotation, said operable means having a bearing element for rotatably supporting the upper end of said first stirring member, said bearing element having an axis of rotation spaced from the axes of rotation of said operable means and said support body means.

3. A device according to claim 1 wherein said first stirring member extends almost the full vertical height of the vessel and said second stirring member extends into said vessel to a depth substantially less than the depth to which said first stirring member extends.

4. A device according to claim 1 further comprising means for supporting the lower end of the first stirring member in the lower part of the vessel.

5. A device according to claim 1 wherein said second stirring member has a free and unsupported lower end.

6. A device according to claim 1 wherein said first and second stirring members are mounted diametrically opposed to one another.

7. A device according to claim 1 wherein said driving means for said first stirring member is located at the lower end of said vessel, said driving means having an output shaft in axial alignment with the axis of symmetry of said vessel, and means connecting said output shaft to the lower end of said first stirring member.

8. A device according to claim 2 wherein said support body means comprises a gear element fixed to said vessel, gear train means meshing with said gear element for rotating said second stirring member about its own axis of rotation.

9. A device according to claim 8 wherein said operable means comprises a rotatable shaft, a gear fixed to said shaft and meshing with said gear element to effect rotation of said rotatable shaft, an arm fixed to said rotatable shaft, said bearing element being carried on said arm and having an axis spaced from the axis of said rotatable shaft.

10. A device according to claim 9 wherein said bearing element comprises a spherical ball having a bore for receiving the end portion of said first stirring member.